United States Patent
Takeuchi et al.

(10) Patent No.: US 8,763,846 B2
(45) Date of Patent: Jul. 1, 2014

(54) BONDING STRUCTURE OF METAL MEMBER AND COMPOSITE-MATERIAL MEMBER

(75) Inventors: Shinsuke Takeuchi, Sagamihara (JP); Eiichi Sato, Sagamihara (JP)

(73) Assignee: Japanese Aerospace Exploration Agency, Tokyo (JP)

( * ) Notice: Subject to any disclaimer, the term of this patent is extended or adjusted under 35 U.S.C. 154(b) by 0 days.

(21) Appl. No.: 13/460,749

(22) Filed: Apr. 30, 2012

(65) Prior Publication Data
US 2012/0325832 A1 Dec. 27, 2012

Related U.S. Application Data

(63) Continuation of application No. PCT/JP2010/069265, filed on Oct. 29, 2010.

(30) Foreign Application Priority Data

Oct. 30, 2009 (JP) ................. 2009-249822

(51) Int. Cl.
*F17C 1/04* (2006.01)
*F17C 1/02* (2006.01)
*F17C 1/16* (2006.01)

(52) U.S. Cl.
CPC ... *F17C 1/04* (2013.01); *F17C 1/02* (2013.01); *F17C 1/16* (2013.01); *F17C 2209/227* (2013.01)
USPC ........................................................ 220/590

(58) Field of Classification Search
CPC ...... F17C 2209/0109; F17C 1/02; F17C 1/16; F17C 2209/227
USPC ............. 220/590, 589, 588, 586, 601, 62.22, 220/560.12; 206/0.6
IPC .......................................... F17C 1/06, 1/04, 1/02
See application file for complete search history.

(56) References Cited

U.S. PATENT DOCUMENTS 1,343,169 A * 6/1920 Douglass ................... 220/62.18
2,718,583 A * 9/1955 Noland et al. ................ 392/458
(Continued)

FOREIGN PATENT DOCUMENTS

| CN | 1926376 A | 3/2007 |
|---|---|---|
| EP | 0 531 055 A2 | 3/1993 |
| EP | 1 793 283 A1 | 6/2007 |
| JP | 05-058395 A | 3/1993 |

(Continued)

OTHER PUBLICATIONS

PCT International Search Report for PCT Counterpart Application No. PCT/JP2010/069265 containing Communication relating to the Results of the International Search Report, 5 pgs., (Nov. 22, 2010).

(Continued)

*Primary Examiner* — Robert J Hicks
(74) *Attorney, Agent, or Firm* — Blakely, Sokoloff, Taylor & Zafman LLP

(57) ABSTRACT

Provided is a bonding structure of a metal member and a composite-material member which comprises a composite-material member and a metal member adhesively bonded to the composite-material member through an adhesive bonding surface therebetween. The metal member has a slit extending along the adhesive bonding surface to form a thin-walled portion between the adhesive bonding surface and the slit.

31 Claims, 8 Drawing Sheets

(56) References Cited

U.S. PATENT DOCUMENTS

| | | | | |
|---|---|---|---|---|
| 2,744,043 | A | * | 5/1956 | Ramberg ...................... 156/155 |
| 2,848,133 | A | * | 8/1958 | Ramberg ...................... 220/590 |
| 3,073,475 | A | * | 1/1963 | Fingerhut ..................... 220/590 |
| 3,112,234 | A | * | 11/1963 | Krupp ........................... 156/169 |
| 3,969,812 | A | * | 7/1976 | Beck ............................ 29/421.1 |
| 4,905,856 | A | * | 3/1990 | Krogager ...................... 220/588 |
| 5,413,240 | A | * | 5/1995 | Hunter et al. .............. 220/254.8 |
| 6,230,922 | B1 | * | 5/2001 | Rasche et al. ................ 220/586 |
| 7,648,042 | B2 | | 1/2010 | Lee et al. |
| 2007/0012551 | A1 | * | 1/2007 | Rohwer et al. ............ 200/61.22 |
| 2007/0122204 | A1 | | 5/2007 | Kita |
| 2007/0164561 | A1 | * | 7/2007 | Kwon et al. .................... 285/45 |

FOREIGN PATENT DOCUMENTS

| | | |
|---|---|---|
| JP | 07-108824 B2 | 11/1995 |
| JP | 09-222198 A | 8/1997 |
| JP | 2006-010036 A | 1/2006 |
| JP | 2007-155841 A | 6/2007 |

OTHER PUBLICATIONS

PCT Written Opinion of the International Searching Authority for PCT Counterpart Application No. PCT/JP2010/069265, 6 pgs., (Nov. 22, 2010).

Office Action and Search Report for corresponding Chinese Patent Application No. 201080048907.5, 6 pages, (Mar. 12, 2014).

* cited by examiner

BONDING STRUCTURE OF METAL MEMBER AND COMPOSITE-MATERIAL MEMBER

CROSS-REFERENCE TO RELATED APPLICATIONS

This patent application is a continuation of International Application No. PCT/JP2010/069265, filed Oct. 29, 2010, entitled JOINT STRUCTURE FOR METAL MEMBER AND COMPOSITE MEMBER, which claims priority to Japanese Patent Application No. 2009-249822, filed Oct. 30, 2009.

TECHNICAL FIELD

The present invention relates to a bonding structure of a metal member and a composite-material member, and more specifically to a bonding structure of a metal member and a composite-material member, with an adhesive bonding portion between the metal member and the composite-material member.

BACKGROUND ART

Generally, in an adhesive bonding portion between a metal member and a composite-material member, material characteristics, such as coefficient of thermal expansion and stiffness, change discontinuously, which causes a situation where stress concentration is likely to occur therein, resulting in debonding. Thus, the occurrence and development of the debonding between the metal member and the composite-material member lead to fracture of a structure including the adhesive bonding portion between the metal member and the composite-material member.

For example, a tank made of composite material (composite-material tank) is lightweight as compared to a tank made of metal (metal tank), so that it is expected to be used as an alternative to an existing metal tank, in the aerospace and automotive fields, etc. Under the current technologies, it is necessary to provide a metal mouthpiece in a connection portion with a pipe or the like. Thus, a tank cannot be entirely made of composite material, i.e., it inevitably has an adhesive bonding portion between a metal member and a composite-material member. Generally, in the adhesive bonding portion between the metal member and the composite-material member, material characteristics, such as coefficient of thermal expansion and stiffness, change discontinuously, which causes a situation where stress concentration is likely to occur therein, resulting in debonding, as mentioned above. The overall strength of the tank is borne by the composite material. Thus, the occurrence and development of the debonding between the metal member and the composite-material member lead to fracture of the tank.

Particularly, when the tank is used for storing cryogenic propellant (such as liquid hydrogen or liquid oxygen) in the aerospace field, it is placed in a situation where debonding is highly likely to occur and develop, because fracture toughness of an adhesive material is substantially decreased at cryogenic temperatures. With a view to preventing such debonding, a technique has been proposed in which, for an inner shell in which a peripheral portion around an opening of a tank is made of metal and an outer shell made of composite material, a fixing means is provided in the peripheral portion around the opening to constrain the inner shell and the outer shell with respect to each other (the following Patent Document 1).

Meanwhile, as for a gas reservoir tank to be used at normal temperature or an automobile fuel tank, there is no possibility of the debonding problem as long as a size and internal pressure thereof are maintained at current levels, because fracture toughness of an adhesive material is relatively high at normal temperature. However, differently from an index (strength) typically used in design, an index (energy release rate) governing the debonding increases in proportion to the second power of pressure (in the strength index, the first power of pressure) and increases in proportion to the first power of size (in the strength index, does not depend on size). Thus, if such a tank is increased in internal pressure and/or size in future, it is predicted that debonding between the metal member and the composite-material member also becomes a problem.

The bonding structure of the metal member and the composite-material member, with the adhesive bonding portion between the metal member and the composite-material member, is also used: in a satellite body, as a bonding structure of a thrust tube made of composite material (composite-material thrust tube), and a bracket made of metal (metal bracket), wherein the metal bracket is used to join the composite-material thrust tube and a top and/or bottom panel together; and, in a rocket, as a bonding structure of a skin plate made of composite material (composite-material skin plate) and formed to constitute a tail fin, and a fitting and joined to a rocket body, wherein the fitting is used to join the composite-material skin plate and the rocket body together. In these bonding structures, debonding between a metal member and a composite-material member also becomes a problem.

LIST OF PRIOR ART DOCUMENTS

Patent Documents

Patent Document 1: JP 2006-10036A

SUMMARY OF THE INVENTION

Problem to be Solved by the Invention

It is therefore an object of the present invention to, in a bonding structure of a metal member and a composite-material member, with an adhesive bonding portion between the metal member and the composite-material member, prevent debonding between the metal member and the composite-material member, for example: in a composite-material tank for a cryogenic fluid, a composite-material tank increased in size and/or internal pressure, or the like, prevent debonding between a metal member and a composite-material member around a piping area; in a satellite body, prevent debonding between a composite-material thrust tube and a metal bracket used to join the composite-material thrust tube and a top and/or bottom panel together; or, in a rocket, prevent debonding between a composite-material skin plate constituting a tail fin, and a fitting joined to a rocket body and used to join the composite-material skin plate and the rocket body together.

Means for Solving the Problem

According to a first aspect of the present invention, there is provided a bonding structure of a metal member and a composite-material member comprising a composite-material member, and a metal member adhesively bonded to the composite-material member through an adhesive bonding surface therebetween, wherein the metal member has a slit extending along the adhesive bonding surface to form a thin-walled portion between the adhesive bonding surface and the slit.

As used in this specification, the term "extending along the adhesive bonding surface" encompasses not only a state of extending parallel to the adhesive bonding surface, but also a state of extending in nonparallel relation to the adhesive bonding surface, i.e., a state of extending at a predetermined angle with respect to the adhesive bonding surface.

Preferably, the slit is filled with a soft filler material.

Preferably, the slit has a bottom subjected to rounding.

More preferably, the bottom of the slit has a semicircular cross-sectional shape.

Preferably, the slit is provided in nonparallel relation to the adhesive bonding surface.

Preferably, the slit is provided, connected to a groove formed in a predetermined length from a surface of the metal member including the adhesive bonding surface.

Preferably, the slit is provided in a number of one or more along a part of the adhesive bonding surface in a length direction of the slit.

More preferably, each of the slits has a side end subjected to rounding.

Preferably, the slit has a width which continuously varies in a length direction of the slit.

Preferably, a region of the metal member on the side of the adhesive bonding surface is reduced in stiffness due to the thin-walled portion formed by the slit.

Preferably, the composite-material member is a thrust tube constituting a satellite body, and the metal member is a bracket for joining the thrust tube and a top and/or bottom panel constituting the satellite body together.

Preferably, the composite-material member is a skin plate of a tail fin of a rocket, and the metal member is a fitting to which the skin plate is adhesively bonded so as to join the tail fin of the rocket and a body of the rocket together.

According to a second aspect of the present invention, there is provided an apparatus which comprises the above bonding structure.

According to a third aspect of the present invention, there is provided a metal member for use in the above bonding structure.

According to a fourth aspect of the present invention, there is provided a tank which comprises an outer shell made of composite material, and a mouthpiece made of metal and formed to have a tubular portion, wherein the mouthpiece is connected to the outer shell at an opening provided in the outer shell, and wherein at least a part of an outer peripheral surface of the tubular portion is adhesively bonded to the opening, and the tubular portion has a slit provided in an outer peripheral region thereof.

Preferably, the slit is filled with a soft filler material.

Preferably, the slit has a bottom subjected to rounding.

More preferably, the bottom of the slit has a semicircular cross-sectional shape.

Preferably, the slit is provided in nonparallel relation to the outer peripheral surface of the mouthpiece.

Preferably, the slit is provided, connected to a groove formed in a predetermined length from the outer peripheral surface of the mouthpiece.

Preferably, the slit is provided in a number of one or more in a part of the outer peripheral region of the tubular portion.

More preferably, each of the slits has a side end subjected to rounding.

Preferably, the slit has a width which continuously varies in a length direction of the slit.

Preferably, the tank further comprises an inner shell, wherein the inner shell is made of resin.

Preferably, the tank further comprises an inner shell, wherein the inner shell is formed as a metal product integrally formed with the mouthpiece.

According to a fifth aspect of the present invention, there is provided a mouthpiece which is made of metal and adapted to be used in a tank comprising an outer shell made of composite material, in such manner that it is connected to the outer shell at an opening provided in the outer shell, wherein the mouthpiece has a tubular portion, and wherein at least a part of an outer peripheral surface of the tubular portion is adhesively bonded to the opening, and the tubular portion has a slit provided in an outer peripheral region thereof.

Effect of the Invention

According to the present invention, in a bonding structure of a metal member and a composite-material member, with an adhesive bonding portion between the metal member and the composite-material member, the metal member is provided with a slit extending along an adhesive bonding surface between the metal member and the composite-material member to form a thin-walled portion between the adhesive bonding surface and the slit, so that a region of the metal member on the side of the adhesive bonding surface is reduced in stiffness. This makes it possible to significantly reduce an energy release rate in the adhesive bonding surface between the metal member and the composite-material member to prevent debonding therebetween.

According to the present invention, in a tank comprising a composite-material outer shell and a metal mouthpiece having a tubular portion, wherein the mouthpiece is connected to the outer shell at an opening provided in the outer shell, a slit is provided in an outer peripheral region of the tubular portion of the mouthpiece of the tank, to reduce a thickness of a region of the mouthpiece adjacent to an adhesive bonding surface between the composite-material outer shell and the tubular portion of the mouthpiece, i.e., the tubular portion of the mouthpiece is provided with a slit extending along an adhesive bonding surface between the composite-material outer shell and the tubular portion of the mouthpiece of the tank, to form a thin-walled portion between the adhesive bonding surface and the slit, so that a region of the tubular portion of the mouthpiece on the side of the adhesive bonding surface is reduced in stiffness. This makes it possible to significantly reduce an energy release rate in the adhesive bonding surface between the composite-material outer shell and the metal mouthpiece to prevent debonding therebetween.

In addition, differently from the technique disclosed in the Patent Document 1 in which, for an inner shell in which a peripheral portion around an opening of a tank is made of metal and an outer shell made of composite material, a fixing means is provided in the peripheral portion around the opening to constrain the inner shell and the outer shell with respect to each other, there is no need for fabrication of a screw hole, and a fixing component. This makes it possible to facilitate fabrication, and reduce the number of components to facilitate a reduction in weight.

According to the present invention, in a satellite body where a composite-material thrust tube and at least one of a top panel and a bottom panel are joined by a metal bracket, the metal bracket is provided with a slit extending along an adhesive bonding surface between the metal bracket and the composite-material thrust tube, to form a thin-walled portion between the adhesive bonding surface and the slit, so that a region of the metal bracket on the side of the adhesive bonding surface is reduced in stiffness. This makes it possible to significantly reduce an energy release rate in the adhesive bonding surface between the thrust tube and the metal bracket to prevent debonding between the thrust tube and the metal bracket.

According to the present invention, in a rocket where a composite-material skin plate constituting a tail fin, and a rocket body, are joined together by a metal fitting joined to the rocket body, the metal fitting is provided with a slit extending along an adhesive bonding surface between the metal fitting and the composite-material skin plate of the tail fin, to form a thin-walled portion between the adhesive bonding surface and the slit, so that a region of the metal fitting on the side of the adhesive bonding surface is reduced in stiffness. This makes it possible to significantly reduce an energy release rate in the adhesive bonding surface between the skin plate of the tail fin and the metal fitting to prevent debonding between the skin plate of the tail fin and the metal fitting.

DESCRIPTION OF EMBODIMENTS

With reference to the drawings, embodiments of the present invention will now be described.

First Embodiment

Figure 1:
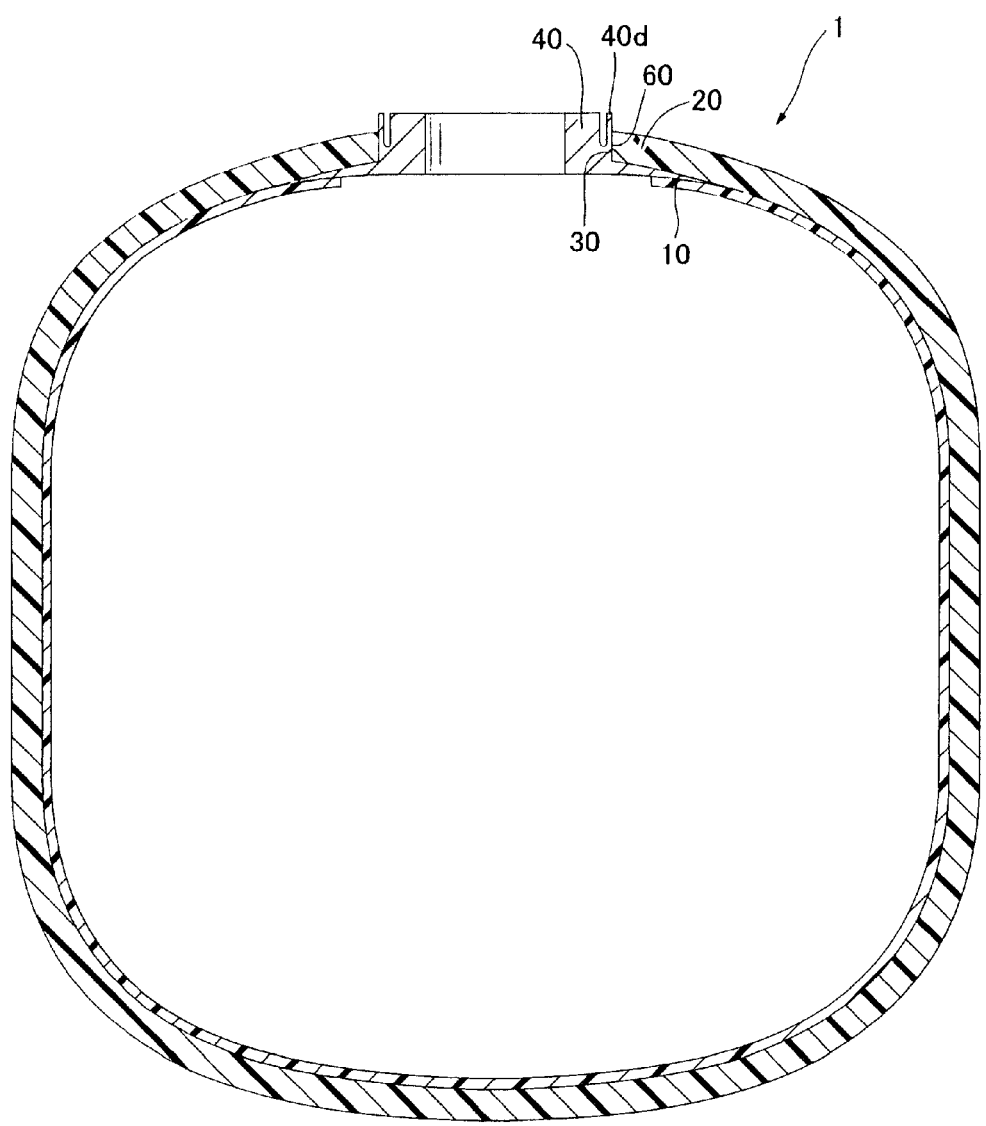
FIG. 1 is a sectional view of a tank according to an embodiment of the present invention.
Figure 2:
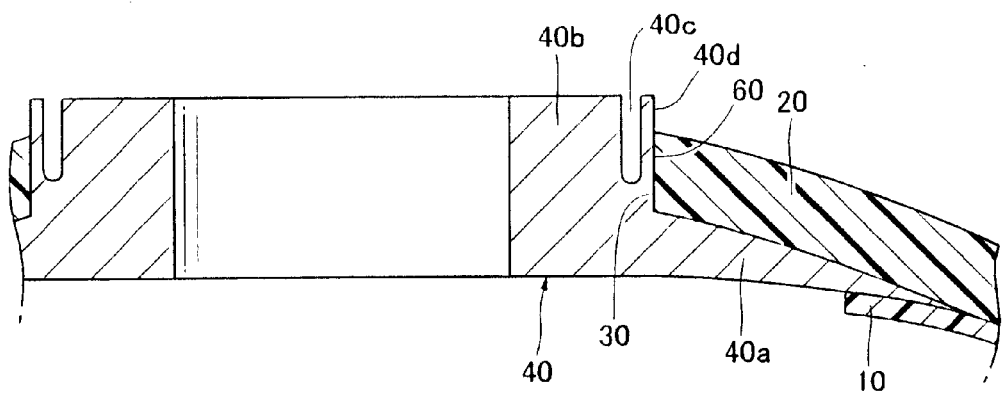
FIG. 2 is a sectional view of a mouthpiece region of the tank according to the embodiment.

FIG. 1 is a sectional view of a tank 1 according to a first embodiment of the present invention, and FIG. 2 is a sectional view of a mouthpiece region of the tank 1. As illustrated in FIG. 1, the tank 1 comprises an inner shell 10, an outer shell 20 covering the inner shell 10, and a mouthpiece 40 connected to the outer shell 20 through an opening 30 provided in the outer shell 20. In FIG. 1, the opening 30 is provided in a top portion of the tank 1. Additionally, another opening 30 and another mouthpiece 40 may be provided in a bottom portion of the tank 1.

The inner shell 10 is formed of a liner made of resin having a high gas barrier capability, such as liquid-crystal polymer and adapted to prevent leakage of an internal fluid.

The mouthpiece 40 is made of metal, such as titanium, and formed in a cylindrical shape. The mouthpiece 40 has a flange portion 40a formed at an end thereof on an inner side of the tank, and a tubular portion 40b standing upwardly from the flange portion 40a.

The outer shell 20 covers an outer side of the inner shell 10 and the mouthpiece 40. The opening 30 provided in the outer shell 20 is adhesively bonded to an outer surface of the flange portion 40a of the mouthpiece 40 and at least a part of an outer peripheral surface of the tubular portion 40b of the mouth piece 40. The opening 30 provided in the outer shell 20 and at least a part of an outer peripheral surface of the tubular portion 40b of the mouth piece 40 are adhesively bonded together through an elongated adhesive bonding surface 60 extending in a circumferential direction of the tubular portion 40b. The outer shell 20 is made of composite material, such as CFRP (Carbon Fiber Reinforced Plastic), and formed, for example, by a filament winding process.

A structure of a mouthpiece region in the tank 1 whose structure is described as above will be more specifically described with reference to FIG. 2.

In an outer peripheral region of the tubular portion 40b of the mouthpiece 40, a slit 40c having a constant width and extending over the entire circumference of the tubular portion 40b is provided parallel to the outer peripheral surface of the tubular portion 40b to reduce a thickness of a region of the mouthpiece 40 adjacent to the adhesive bonding portion between the outer shell 20 and the tubular portion 40b. In other words, the tubular portion 40b of the mouthpiece 40 is provided with a slit 40c extending along the adhesive bonding surface 60 in a length direction of the slit 40c to form a thin-walled portion 40d between the adhesive bonding surface 60 and the slit 40c.

A bottom of the slit 40c is subjected to rounding not to have an edged corner so as to avoid stress concentration. Preferably, the bottom of the slit 40c is formed to have a semicircular cross-sectional shape.

With reference to FIGS. 3 to 6, an example of a simulation on a principle of the first embodiment will be described.

Figure 3:
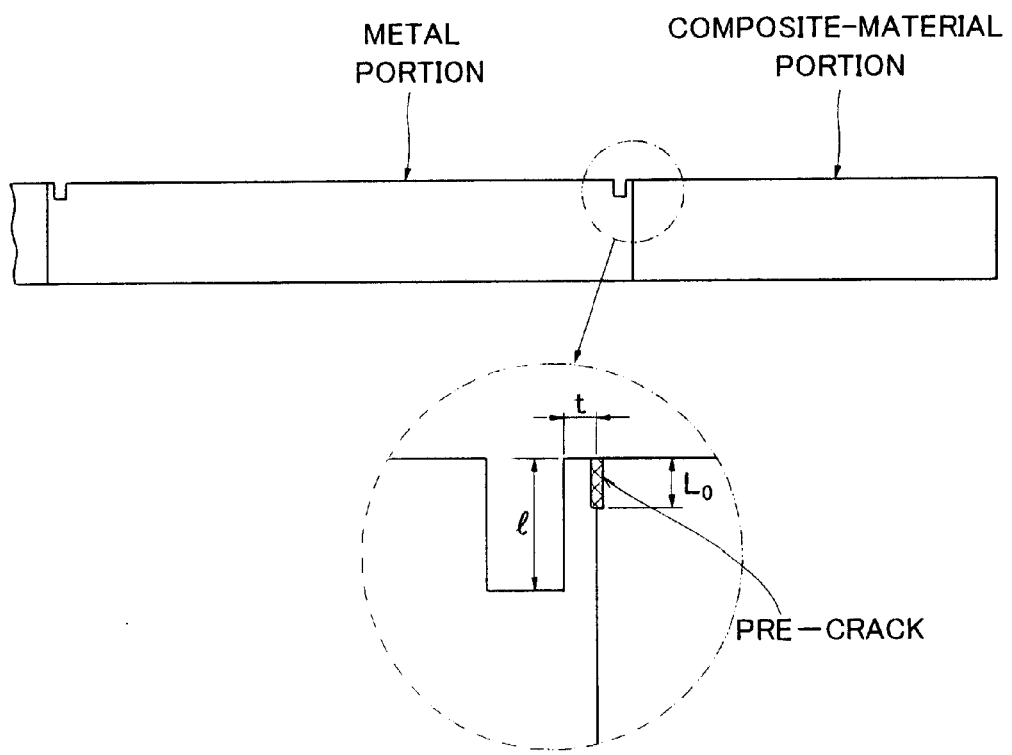
FIG. 3 is a schematic diagram illustrating a tank model for a simulation on a principle of the embodiment.

Firstly, a simulation using a disk model will be described below. The disk model is a disk prepared by adhesively bonding a composite material to an outer periphery of a metal disk, as illustrated in FIG. 3. The disk has the following dimensions: diameter of the metal portion=50 mm; outer diameter of the composite-material portion=100 mm; and thickness=30 mm, and a pre-crack having a length $L_0$ is input at a boundary between the metal portion and the composite-material portion. The metal portion is made of titanium, and the composite-material portion is made of CFRP in which a fiber direction is set in a circumferential direction thereof. A tension of 100 MPa simulating a pressure load is applied to an outer periphery of the composite-material portion axisymmetrically and uniformly.

Figure 4:
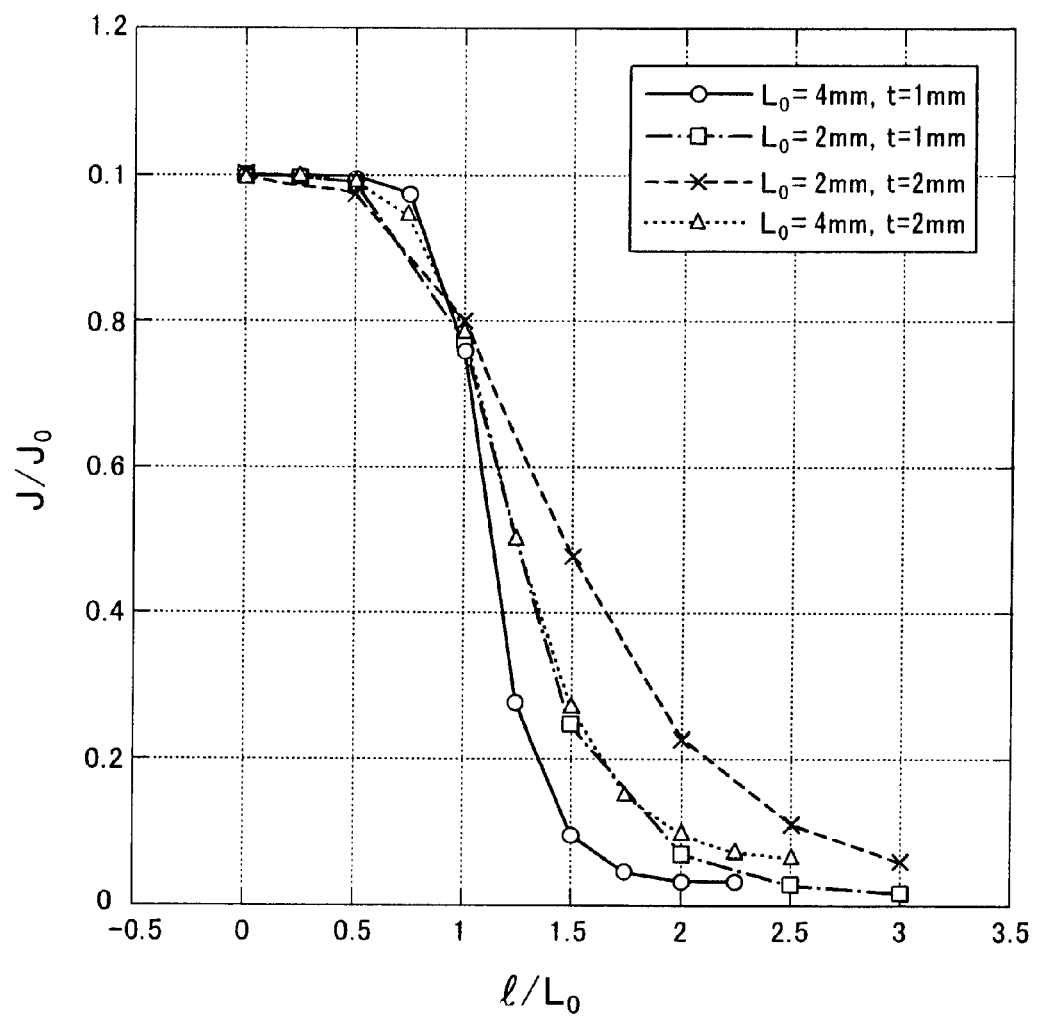
FIG. 4 is a graph illustrating a result of the simulation using the model in FIG. 3.

FIG. 4 is a graph using the length $L_0$ of the pre-crack and a thickness t of the metal portion between the outer peripheral surface of the slit and the outer spherical surface of the metal portion as parameters, wherein the horizontal axis represents a dimensionless value obtained by dividing a depth 1 by the $L_0$, and the vertical axis represents a dimensionless value for the 1 obtained by dividing an energy release rate J by an energy release rate $J_0$ devoid of the slit. In this case, an energy release rate is proportional to the square of the pressure load-simulating load. Thus, an effect of reducing the energy release rate does not depend on the absolute value 100 MPa, except error in calculational accuracy.

As seen in FIG. 4, energy release rate reduction ratios in case of providing a slot having a depth approximately equal to the pre-crack length, in case of providing a slot having a depth about two times the pre-crack length, and in case of providing a slot having a depth about three times the pre-crack length, are about 80%, about 10 to 20%, and 10% or less, respectively. As to the thickness t of the metal portion between the outer peripheral surface of the slit and the outer spherical surface of the metal portion, in a region where the depth of the slit is two times or more the pre-crack length, a value of the energy release rate becomes smaller as a value of the thickness t becomes smaller, although there is an exception in a region where the slit is shallow. This shows that an energy release rate at the boundary can be effectively reduced by fabricating a slit having a depth two to three times or more an expected maximum pre-crack length, at a position as adjacent to the boundary as possible.

Figure 5:
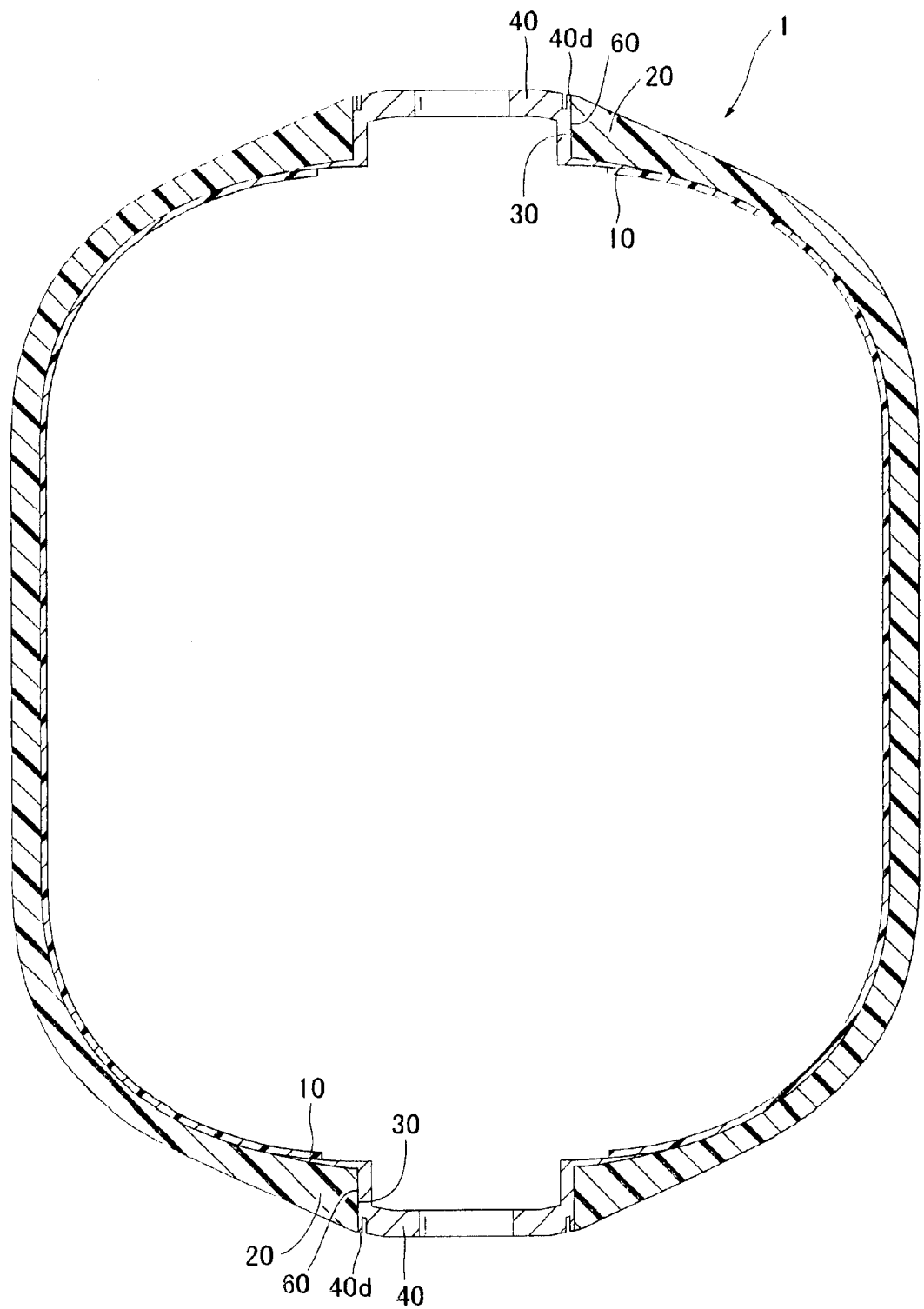
FIG. 5 is a sectional view of a tank subjected to a simulation, according to the embodiment.
Figure 6:
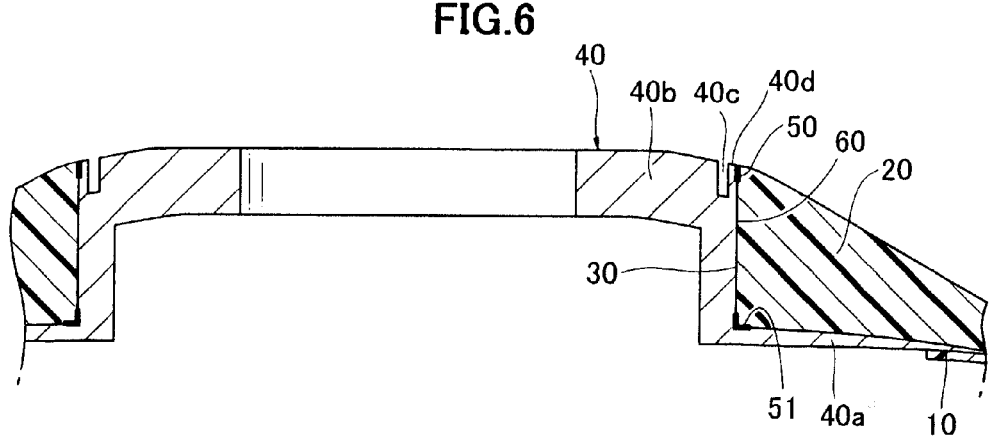
FIG. 6 is a sectional view of a mouthpiece region of the tank subjected to the simulation, according to the embodiment.

Secondly, a simulation performed for a tank having a structure similar to that illustrated in FIG. 1 will be described below. FIG. 5 is a sectional view of the tank subjected to this simulation, and FIG. 6 is a sectional view of a mouthpiece region of the tank. In FIGS. 5 and 6, an element or component corresponding to that in FIGS. 1 and 2 is assigned with the same reference numeral or code, and the description of an element or component equivalent to that in the above embodiment will be omitted.

In the tank 1 illustrated in FIG. 1, the opening 30 provided in the outer shell 20 and the mouthpiece 40 connected to the opening 30 are provided only in the top portion thereof. In the tank 1 subjected to this simulation, another opening 30 and another mouthpiece 40 are further provided in a bottom portion thereof. An inner shell 10 is made of liquid-crystal polymer, and an outer shell 20 comprises a CFRP layer, and a GFRP (Glass Fiber Reinforced Plastic) reinforcement layer formed on an inner side of the CFRP layer by a hand lay-up process to cope with a filament winding process. The mouthpiece 40 is made of titanium. The tank has: a diameter of 700 mm in a body thereof; a length (a distance between opposite outer end surfaces of respective tubular portions of the two mouthpieces) of 1200 mm; a maximum expected operating pressure (MEOP) of 32 MPa; a proof pressure of 40 MPa; and a burst pressure of 48 MPa. A calculational condition for the simulation was set to an internal pressure of 48 MPa equal to the burst pressure. The outer shell 20 and the inner shell 10 are adhesively bonded together, whereas the mouthpiece 40 and the inner shell 10 are directly bonded together by heat fusion (fusion bonding).

As illustrated in FIG. 6, assuming that there are two pre-cracks 50, 51 at an upper end and a lower end of an adhesive bonding portion between the outer shell 20 and the mouthpiece 40, a simulation on an energy release rate at the upper end of the adhesive bonding portion was performed in the case where a slit 40c was provided as illustrated in FIG. 6, and in the case where there was no slit. In this case, the slit 40c was provided in an outer peripheral region of a tubular portion 40b of the mouthpiece 40, having a constant width and extending over the entire circumference of the tubular portion 40b in parallel relation to an outer peripheral surface of the tubular portion 40b. A length $L_0$ of the pre-crack 50 was set to 4 mm, taking into account a detection capability by nondestructive inspection and a calculational mesh size. In the same manner, each of a length of the pre-crack 51 along the outer peripheral surface of the tubular portion 40b and a length of the pre-crack 51 along a surface of a flange portion 40a on an outer side of the tank was set to about 4 mm. A thickness t of a metal portion of the tubular portion 40b outside the slit was set to 4 mm, and a depth 1 of the slit was set to 16 mm.

As a result, an energy release rate $J_0$ in the case where there was no slit was about 5200 J/m$^2$, whereas an energy release rate J in the case where the slit was provided was about 380 J/m$^2$, i.e., an energy release rate was reduced by one digit or more.

A simulation on von Mises strain including plastic strain was also carried out. As a result, it could be verified that no design problem in strength is caused by providing the slit.

In view of the above simulation results, it is preferable that the thickness of the region of the mouthpiece adjacent to the adhesive bonding portion between the outer shell 20 and the tubular portion 40b is reduced as much as possible. Further, it is preferable that the depth of the slit 40c is two times or more a minimum detectable defect size determined by nondestructive inspection capability. This is based on the assumption that, in a situation where no pre-crack is found by nondestructive inspection, a pre-crack length is equal to or less than the minimum detectable defect size, so that the pre-crack length is considered as the minimum detectable defect size which is a possible maximum value thereof.

Meanwhile, water or the like is likely to accumulate in the slit 40c, causing corrosion. In order to avoid this problem, the slit 40c may be filled with a filler material. In this case, if a filler material having high hardness, such as an adhesive material, is used, the intended effects of the slit will be deteriorated. Thus, it is preferable that the slit is filled with a soft (low-hardness) filler material, such as silicone sealant.

In the case where the tank 1 according to the first embodiment is a high-pressure, large-sized, composite-material, filament-wound, gas reservoir tank, and a problem occurs that a composite-material layer is debonded from a mouthpiece during high-pressure conditions, if a slit is provided to extend over the entire circumference of the tubular portion 40b in parallel to the outer peripheral surface of the tubular portion 40b (assuming that the bottom of the slit is formed to have a semicircular cross-sectional shape so as to avoid stress concentration), a pressure causing debonding can be raised by about three times as compared to the case where there is no slit under the following conditions. A depth of a slit is set to about 20 mm which is five times a minimum detectable defect size determined by nondestructive inspection capability, considering that it is preferable to set the slit depth to a value sufficiently greater than two times of an expected pre-crack length, in addition to post-slitting strength, and assuming that the minimum detectable defect size is about 4 mm, i.e., the expected pre-crack length is about 4 mm or less. Further, the thickness of the region of the mouthpiece 40 adjacent to the adhesive bonding portion between the outer shell 20 and the tubular portion 40b is set to become equal to about 1 mm because it is preferable to minimize the thickness of the region of the mouthpiece 40 adjacent to the adhesive bonding portion between the outer shell 20 and the tubular portion 40b, taking into consideration fabrication limitation.

In the case where the tank 1 according to the first embodiment is a composite-material tank for a cryogenic propellant and a problem occurs that a composite-material layer is debonded from a mouthpiece due to thermal stress during charging of the cryogenic propellant, if a slit is provided in the same manner as above, the occurrence of debonding during charging of the cryogenic propellant can be significantly suppressed as compared to the case where there is no slit. In this case, when the slit is filled with a soft filler material in view of anti-corrosion, etc., it is preferable to select a filler material free of hardening and fragmentation even at cryogenic temperatures.

As above, according to the first embodiment, stiffness of a region of the tubular portion of the mouthpiece on the side of the adhesive bonding surface is reduced by providing the slit 40c in an outer peripheral region of the tubular portion 40b of the mouthpiece 40 of the tank to reduce the thickness of the region of the mouthpiece adjacent to the adhesive bonding portion between the composite-material outer shell 20 and the tubular portion 40b of the mouthpiece 40 of the tank, i.e., by providing in the tubular portion 40b of the mouthpiece 40 the slit 40c extending along the adhesive bonding surface 60 such that the thin-walled portion 40d is formed between the slit 40c and the adhesive bonding surface 60 between the composite-material outer shell 20 and the tubular portion 40b of the mouthpiece 40. This makes it possible to significantly reduce the energy release rate in the adhesive bonding surface between the outer shell 20 and the mouthpiece 40, and greatly contribute to prevention of debonding between the mouthpiece and the composite material.

Second Embodiment

Figure 7:
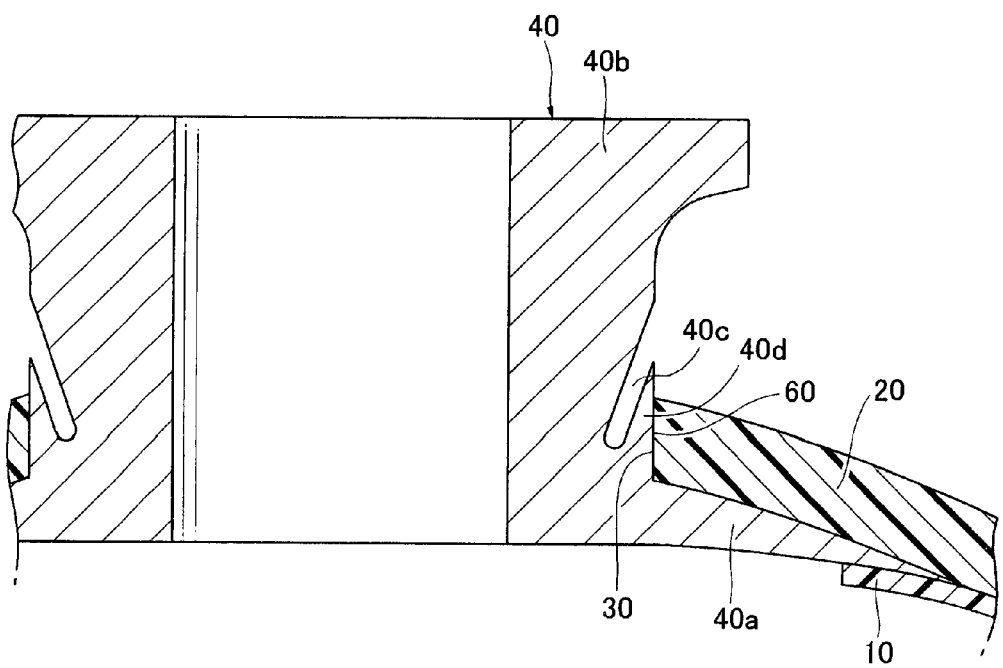
FIG. 7 is a sectional view of a mouthpiece region of a tank according to an other embodiment of the present invention.
Figure 8:
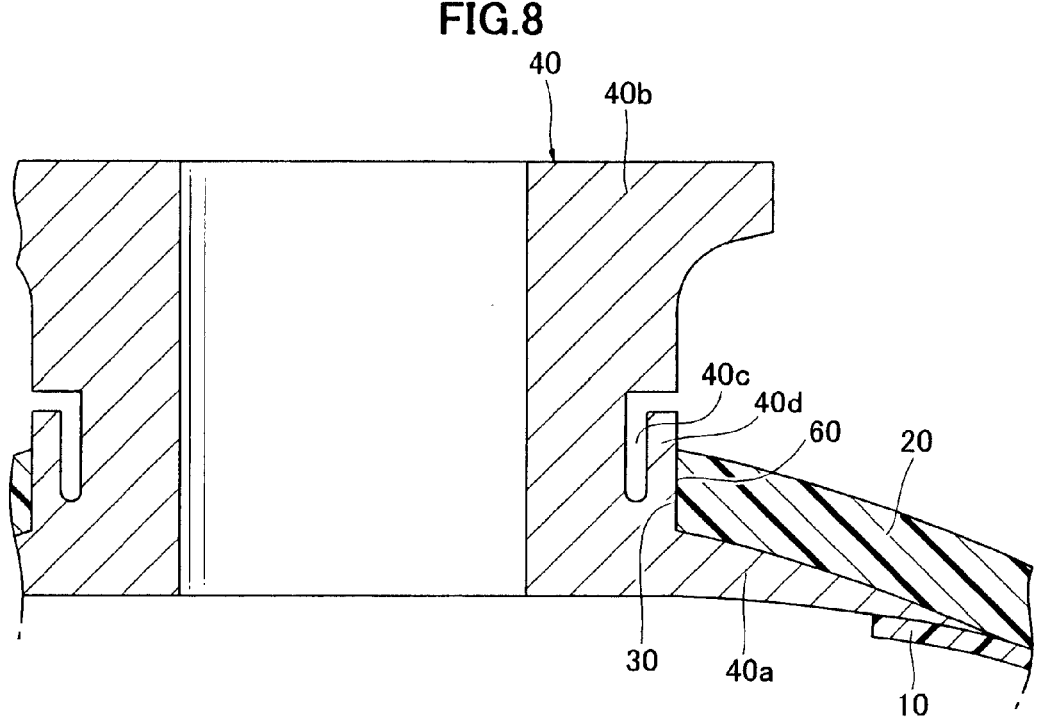
FIG. 8 is a sectional view of a mouthpiece region of a modification of the tank according to the other embodiment.

FIGS. 7 and 8 are sectional views of a mouthpiece region of a tank 1 according to a second embodiment of the present invention. In the second embodiment, any configuration other than a mouthpiece 40 is the same as that in FIG. 1. In FIGS. 7 and 8, an element or component corresponding to that in FIGS. 1 and 2 is assigned with the same reference numeral or code, and the description of an element or component equivalent to that in the first embodiment will be omitted.

The second embodiment is intended to, when it is difficult to fabricate a slit 40c from an end of a tubular portion 40b of the mouthpiece 40 on an outer side of the tank due to a shape of the mouthpiece 40, fabricate the slit 40c from an outer peripheral surface of the tubular portion 40b to obtain the same effects as those in the first embodiment. For example, as illustrated in FIG. 7, a slit 40c is formed obliquely with respect to the outer peripheral surface of the tubular portion 40b, or an adhesive bonding surface 60. In this case, it is preferable to minimize a thickness of a thin-walled portion 60 which is a metal portion of the tubular portion 40b outside the slit, because an effect of reducing an energy release rate in the adhesive bonding surface between an outer shell 20 and the mouthpiece 40 depends on the thickness of the thin-walled portion 60.

Alternatively, for example, as illustrated in FIG. 8, a groove is formed in the tubular portion 40b in a direction perpendicular to the outer peripheral surface of the tubular portion 40b, or the adhesive bonding surface 60, and then a slit 40c is formed in the tubular portion 40b in parallel relation to the outer peripheral surface of the tubular portion 40b. In this case, the groove may be formed at any angle with respect to the outer peripheral surface of the tubular portion 40b, instead of the perpendicular relation thereto. Further, the slit 40c may be formed at any angle with respect to the outer peripheral surface of the tubular portion 40b, instead of the parallel relation thereto. In other word, the slit 40c may be provided, connected to a groove formed in a predetermined length from the outer peripheral surface of the tubular portion 40b, or the adhesive bonding surface 60.

In regard to the second embodiment, the mouthpiece 40 can be formed with a screw hole for allowing a member such as a closer or a fluid adapter to be connected thereto. In this case, the presence of the screw hole and the like is likely to preclude formation of the aforementioned slit having a constant width and extending over the entire circumference of the tubular portion 40b. In this situation, one or more slits may be provided along only a part of the entire circumference, i.e., along a part of the adhesive bonding surface 60 in a length direction of the slit 40c. In this case, preferably, each of the slits has a bottom subjected to rounding, and, more preferably, the bottom of the slit is formed to have a semicircular cross-sectional shape. Preferably, each of the slits has a side end subjected to rounding, and, more preferably, the side end of the slit is formed to have a semicircular cross-sectional shape.

Alternatively, when the slit having a constant width and extending over the entire circumference of the tubular portion 40b cannot be provided due to the presence of the screw hole and the like, a width of the slit may be narrowed only near the screw hole and the like to avoid the screw hole and the like. In this case, it is preferable that the width of the slit continuously varies in the length direction of the slit in order to avoid stress concentration due to discontinuous change in the width of the slit.

In the above embodiments, the tank is configured such that the inner shell 10 is made of resin and formed separately from the mouthpiece 40. However, it is apparent to those skilled in the art that the technique in the above embodiments can be applied to a conventional tank configured such that an inner shell is made of metal and formed integrally with a mouthpiece 40.

Third Embodiment

Figure 9:
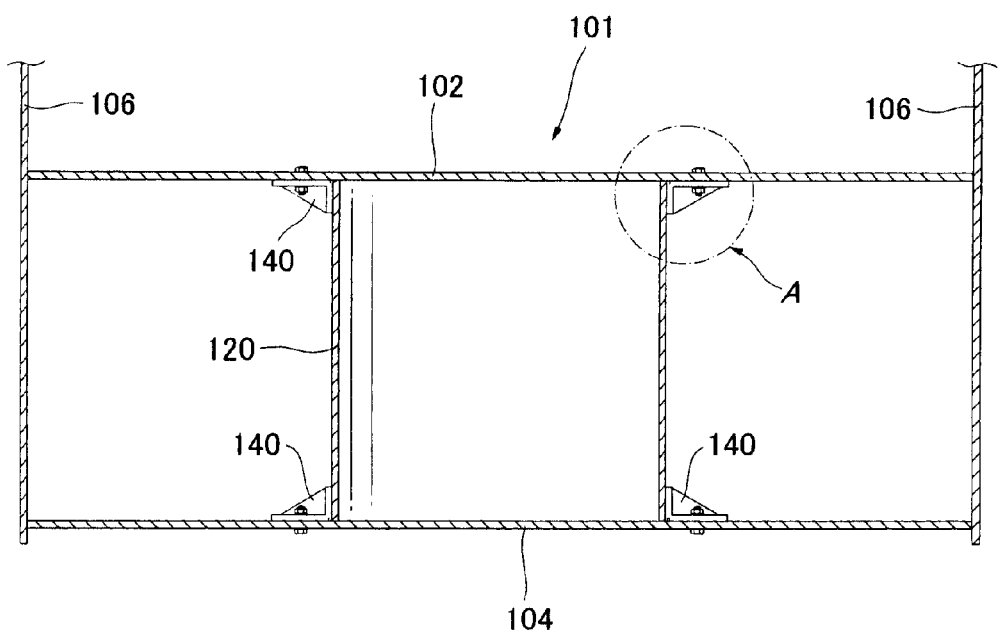
FIG. 9 is a sectional view of a satellite body according to an other embodiment of the present invention.

FIG. 9 is a sectional view of a satellite body 101 according to a third embodiment of the present invention. As illustrated in FIG. 9, a cylindrical-shaped CFRP thrust tube 120 is disposed in the middle of an internal space of the satellite body 101, and a circular-shaped top panel 102 and a circular-shaped bottom panel 104 are attached, respectively, to a top and a bottom of the thrust tube 120 by metal brackets 140. Further, a cylindrical-shaped exterior panel 106 is attached to the top panel 102 and the bottom panel 104 to define an outer surface of the satellite body 101. In this structure, the thrust tube 120 supports the entire load of a satellite.

Figure 10:
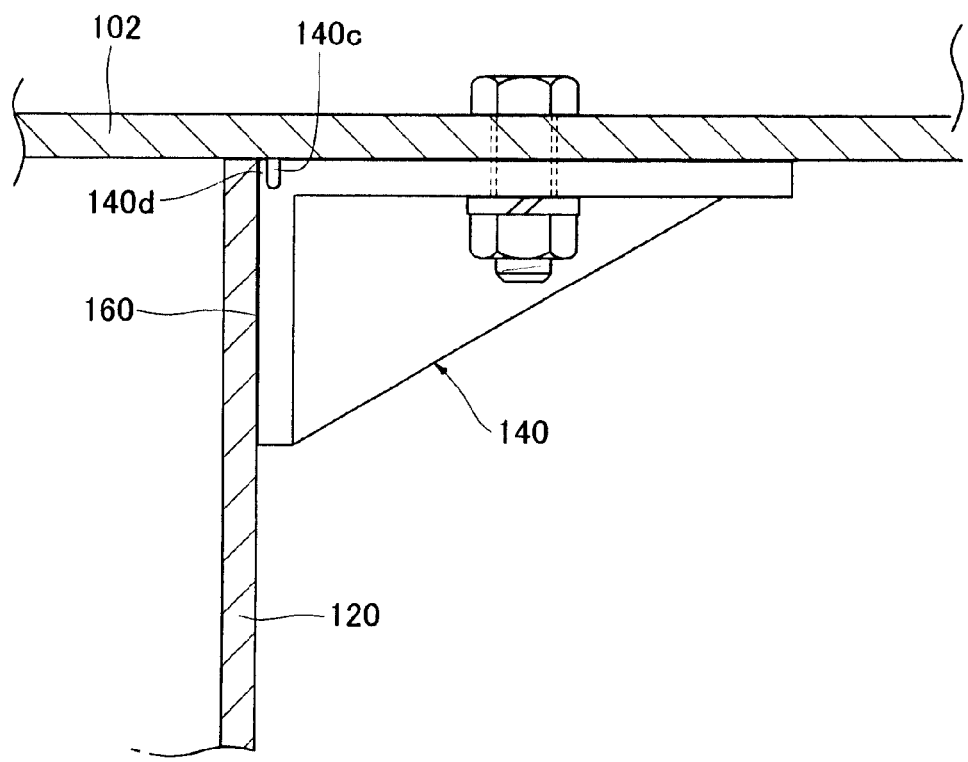
FIG. 10 is a sectional view of a joining region between a thrust tube and an upper panel of the satellite body according to the other embodiment.

FIG. 10 is a sectional view of a joining region between the thrust tube 120 and the upper panel 102 which is an enlarged view of the section A in FIG. 9. As illustrated in FIG. 10, the thrust tube 120 and a vertical piece of the metal bracket 140 are adhesively bonded together through an adhesive bonding surface 160, and the top panel 102 and a horizontal piece of the metal bracket 140 are screwed to each other to join the thrust tube 120 and the top panel 102 together. The thrust tube 120 and the bottom panel 104 are joined together in the same structure.

The metal bracket 140 is provided with a slit 140c extending along the adhesive bonding surface 160 to form a thin-walled portion 140d between the adhesive bonding surface 160 and the slit 140c. The slit 140c has a bottom subjected to rounding not to have an edged corner so as to avoid stress concentration. Preferably, the bottom of the slit 140c is formed to have a semicircular cross-sectional shape.

The thin-walled portion 140d is formed by providing the slit 140c in the above manner, so that a region of the metal bracket 140 on the side of the adhesive bonding surface 160 is reduced in stiffness. This makes it possible to significantly reduce an energy release rate in the adhesive bonding surface between the thrust tube 120 and the metal bracket 140, and greatly contribute to prevention of debonding between the thrust tube and the metal bracket.

The third embodiment may be modified by employing: the feature in which the slit is filled with a soft filler material; the feature in which the slit is provided in nonparallel relation to the adhesive bonding surface; the feature in which the slit is provided, connected to a groove formed in a predetermined length from a surface of the metal member including the adhesive bonding surface; the feature in which the slit is provided in a number of one or more along a part of the adhesive bonding surface in a length direction of the slit; the feature in which each of the slits has a side end subjected to rounding; and the feature in which the slit has a width which continuously varies in a length direction of the slit, as with the second embodiment with respect to the first embodiment.

Figure 11:
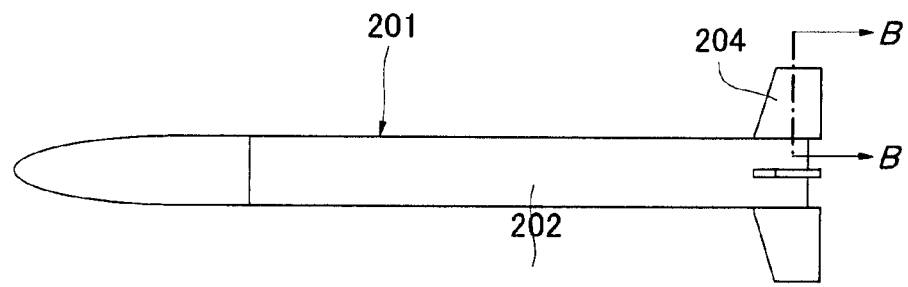
FIG. 11 is a sectional view of a rocket according to an other embodiment of the present invention.

FIG. 11 is a side view of a rocket 201 according to a fourth embodiment of the present invention. As illustrated in FIG. 11, a tail fin 204 is attached to a lower portion of a rocket body 202 of the rocket 201.

Figure 12:
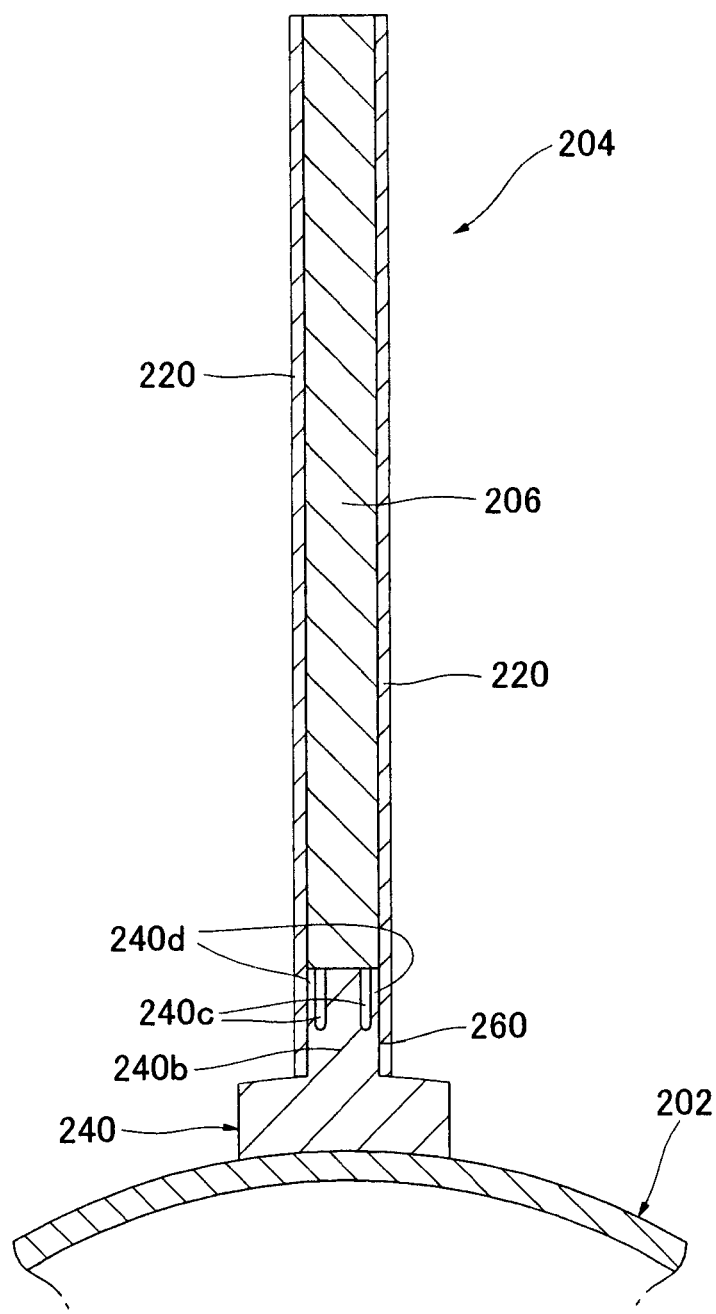
FIG. 12 is a sectional view of a joining region between a rocket body and a tail fin of the rocket according to the other embodiment.

FIG. 12 is a sectional view of a joining region between the rocket body 202 and the tail fin 204 which is a sectional view taken along the line B-B in FIG. 11. As illustrated in FIG. 11, an aluminum fitting 240 is provided on a surface of the rocket body 202. Further, the tail fin 204 is formed by using an aluminum honeycomb body 206 as a core, and adhesively bonding CFRP skin plates 220 to both surfaces of the aluminum honeycomb body 206.

The aluminum fitting 240 has a protrusion 240b. A top surface of the protrusion is brought into contact with the aluminum honeycomb body 206, and the CFRP skin plates 220 are adhesively bonded to side surfaces of the protrusion through an adhesive bonding surface 260, so that the rocket body 202 and the tail fin 204 are joined together.

The protrusion 240b of the aluminum fitting 240 is provided with a slit 240c extending along the adhesive bonding surface 260 to form a thin-walled portion 240d between the adhesive bonding surface 260 and the slit 240c. The slit 240c has a bottom subjected to rounding not to have an edged corner so as to avoid stress concentration. Preferably, the bottom of the slit 240c is formed to have a semicircular cross-sectional shape.

The thin-walled portion 240d is formed by providing the slit 240c in the above manner, so that a region of the aluminum fitting 240 on the side of the adhesive bonding surface 260 is reduced in stiffness. This makes it possible to significantly reduce an energy release rate in the adhesive bonding surface between the CFRP skin plate 220 of the tail fin 204 and the aluminum fitting 240, and greatly contribute to prevention of debonding between the tail fin (CFRP skin plate) and the aluminum fitting.

The fourth embodiment may be modified by employing: the feature in which the slit is filled with a soft filler material; the feature in which the slit is provided in nonparallel relation to the adhesive bonding surface; the feature in which the slit is provided, connected to a groove formed in a predetermined length from a surface of the metal member including the adhesive bonding surface; the feature in which the slit is provided in a number of one or more along a part of the adhesive bonding surface in a length direction of the slit; the feature in which each of the slits has a side end subjected to rounding; and the feature in which the slit has a width which continuously varies in a length direction of the slit, as with the second embodiment with respect to the first embodiment.

Although the present invention has been described with reference to specific embodiments by way of illustration, it is to be understood that the present invention is not limited to such embodiments, but it is obvious to those skilled in the art that various changes and modifications may be made therein without departing from the spirit and scope of the present invention as set forth in appended claims.

EXPLANATION OF CODES

1: tank
10: inner shell
20: outer shell
30: opening
40: mouthpiece
40a: flange portion
40b: tubular portion
40c: slit
40d: thin-walled portion
50: pre-crack
51: pre-crack
60: adhesive bonding surface
101: satellite body
102: top panel
104: bottom panel
106: exterior panel
120: thrust tube
140: bracket
140c: slit
140d: thin-walled portion
160: adhesive bonding surface
201: rocket
202: rocket body
204: tail fin
206: aluminum honeycomb body
220: CFRP skin plate
240: fitting
240b: protrusion
240c: slit
240d: thin-walled portion
260: adhesive bonding surface

What is claimed is:

1. A bonding structure of a metal member and a composite-material member comprising a composite-material member, and a metal member adhesively bonded to the composite-material member through an adhesive bonding surface therebetween, wherein the metal member has a slit extending along the adhesive bonding surface to form a thin-walled portion between the adhesive bonding surface and the slit.

2. The bonding structure as defined in claim 1, wherein the slit is filled with a soft filler material.

3. The bonding structure as defined in claim 1, wherein the slit has a bottom subjected to rounding.

4. The bonding structure as defined in claim 3, wherein the bottom of the slit has a semicircular cross-sectional shape.

5. The bonding structure as defined in claim 1, wherein the slit is provided in nonparallel relation to the adhesive bonding surface.

6. The bonding structure as defined in claim 1, wherein the slit is provided, connected to a groove formed in a predetermined length from a surface of the metal member including the adhesive bonding surface.

7. The bonding structure as defined in claim 1, wherein the slit is provided in a number of one or more along a part of the adhesive bonding surface in a length direction of the slit.

8. The bonding structure as defined in claim 7, wherein each of the slits has a side end subjected to rounding.

9. The bonding structure as defined in claim 1, wherein the slit has a width which continuously varies in a length direction of the slit.

10. The bonding structure as defined in claim 1, wherein a region of the metal member on the side of the adhesive bonding surface is reduced in stiffness due to the thin-walled portion formed by the slit.

11. The bonding structure as defined in claim 1, wherein the composite-material member is a thrust tube constituting a satellite body, and the metal member is a bracket for joining the thrust tube and a top and/or bottom panel constituting the satellite body together.

12. The bonding structure as defined in claim 1, wherein the composite-material member is a skin plate of a tail fin of a rocket, and the metal member is a fitting to which the skin plate is adhesively bonded so as to join the tail fin of the rocket and a body of the rocket together.

13. An apparatus comprising a bonding structure of a metal member and a composite-material member comprising a composite-material member, and a metal member adhesively bonded to the composite-material member through an adhesive bonding surface therebetween, wherein the metal member has a slit extending along the adhesive bonding surface to form a thin-walled portion between the adhesive bonding surface and the slit.

14. A metal member for use in a bonding structure of a metal member and a composite-material member comprising a composite-material member, and a metal member adhesively bonded to the composite-material member through an adhesive bonding surface therebetween, wherein the metal member has a slit extending along the adhesive bonding surface to form a thin-walled portion between the adhesive bonding surface and the slit.

15. A tank comprising an outer shell made of composite material, and a mouthpiece made of metal and formed to have a tubular portion, the mouthpiece being connected to the outer shell at an opening provided in the outer shell, wherein at least a part of an outer peripheral surface of the tubular portion is adhesively bonded to the opening through an adhesive bonding surface therebetween, wherein the tubular portion has a slit with a length dimension, a depth dimension, and a width dimension, wherein the slit extends along the adhesive bonding surface in a length direction of said length dimension of the slit to form a thin-walled portion between the adhesive bonding surface and the slit.

16. The tank as defined in claim 15, wherein the slit is filled with a soft filler material when the tank is completed.

17. The tank as defined in claim 15, wherein the slit has a bottom subjected to rounding.

18. The tank as defined in claim 17, wherein the bottom of the slit has a semicircular cross-sectional shape.

19. The tank as defined in claim 15, wherein the slit is provided in nonparallel relation to the outer peripheral surface of the tubular portion.

20. The tank as defined in claim 15, wherein the slit is provided, connected to a groove formed in a predetermined length from the outer peripheral surface of the tubular portion.

21. The tank as defined in claim 15, wherein the slit is provided in a number of one or more in a part of the outer peripheral region of the tubular portion.

22. The tank as defined in claim 21, wherein each of the slits has a side end subjected to rounding.

23. The tank as defined in claim 15, wherein the slit has a width which continuously varies in said length direction of the slit.

24. The tank as defined in claim 15, which further comprises an inner shell, wherein the inner shell is made of resin.

25. The tank as defined in claim 15, which further comprises an inner shell, wherein the inner shell is formed as a metal product integrally formed with the mouthpiece.

26. The tank as defined in claim 15, wherein the slit is provided over approximately the entire circumference of the tubular portion.

27. The tank as defined in claim 15, wherein the slit is provided in parallel relation to the outer peripheral surface of the tubular portion.

28. The tank as defined in claim 15, wherein a depth of the slit is two times or more a critical pre-crack length at the adhesive bonding surface.

29. The tank as defined in claim 15, wherein a depth of the slit is two times or more a minimum detectable defect size determined by nondestructive inspection capability.

30. The tank as defined in claim 15, wherein the slit forms an air space.

31. The tank as defined in claim 15, wherein the slit is filled with a soft filler material for preventing corrosion.

* * * * *